United States Patent
Weiss et al.

[11] Patent Number: 6,073,524
[45] Date of Patent: Jun. 13, 2000

[54] METAL BORING WITH SELF-PROPELLED ROTARY CUTTERS

[75] Inventors: Harry M. Weiss, Murrietta, Calif.; Philip S. Szuba, Clinton Township, Macomb County, Mich.; Peter M. Beecherl, Shelby Township, Macomb County, Mich.; Gregory J. Kinsler, Utica, Mich.

[73] Assignee: Rotary Technologies Corporation, Rancho Dominguez, Calif.

[21] Appl. No.: 09/035,182

[22] Filed: Mar. 4, 1998

[51] Int. Cl.[7] ...................................................... B23B 35/00
[52] U.S. Cl. ............................... 82/1.11; 407/35; 407/43; 407/46; 407/64; 409/232
[58] Field of Search .................................... 407/33, 35, 43, 407/46, 48, 50, 52, 62, 64, 65; 82/1.11; 409/232

[56] References Cited

U.S. PATENT DOCUMENTS

| | | |
|---|---|---|
| 1,542,007 | 6/1925 | Schroeder . |
| 1,577,952 | 3/1926 | Carnegie . |
| 2,230,455 | 2/1941 | Githens ........................................ 77/58 |
| 2,383,958 | 9/1945 | De Vlieg ...................................... 77/4 |
| 2,551,167 | 5/1951 | Rolland ....................................... 29/96 |
| 2,630,725 | 3/1953 | Black ..................................... 407/48 X |
| 2,885,766 | 5/1959 | Ernst et al. ................................ 29/105 |
| 3,213,716 | 10/1965 | Getts ........................................... 77/58 |
| 3,329,065 | 7/1967 | Vaughn .................................... 409/232 |
| 3,515,029 | 6/1970 | Gambini ...................................... 90/11 |
| 3,670,380 | 6/1972 | Moore et al. ............................. 29/105 |
| 4,093,392 | 6/1978 | Hopkins .................................... 407/48 |
| 4,181,049 | 1/1980 | Borisenko et al. ........................ 82/1 C |
| 4,367,990 | 1/1983 | Porat et al. ............................... 407/114 |
| 4,378,184 | 3/1983 | Briese ....................................... 407/113 |
| 4,477,211 | 10/1984 | Briese ........................................... 407/7 |
| 4,506,715 | 3/1985 | Blackwell .............................. 407/48 X |
| 4,621,955 | 11/1986 | Briese ....................................... 407/114 |
| 5,478,175 | 12/1995 | Kraemer ................................ 407/64 X |
| 5,505,568 | 4/1996 | Takama et al. ........................ 407/64 X |

FOREIGN PATENT DOCUMENTS

| | | |
|---|---|---|
| 713504 | 11/1941 | Germany . |
| 523761 | 8/1976 | U.S.S.R. . |
| 649507 | 2/1979 | U.S.S.R. . |
| 2057939 | 4/1981 | United Kingdom . |

OTHER PUBLICATIONS

Rotary Technologies Corporation; Rotary Milling Cutters Operating Manual; 1986.

Choi, Gi Hueng, et al.; A Study on Rotary Tool Machining; pp. 791–798; publisher and date unknown.

Armarego, E.J.A., et al.; Computer–Aided Predictive Models for Fundamental Rotary Tool Cutting Process; pp. 49–54; publisher and date unknown.

Chen, Ping; High Performance Machining of SiC Whisker Reinforced Aluminum Composite by Self–Propelled Rotary Tools; 4 pp.; publisher and date unknown.

*Primary Examiner*—Henry W. H. Tsai
*Attorney, Agent, or Firm*—Christie, Parker & Hale, LLP

[57] ABSTRACT

A boring tool for use with compacted graphite iron materials includes at least one self-propelled rotating cutter insert. The insert is carried in a cartridge in which the insert is rotatable about is axis which is a secondary axis relative to a boring tool body in which the cartridge is mountable and which is rotatable about a primary axis. In the tool, the insert has its cutting point most distant from the tool axis that is the location at which axial and radial rake angles are defined to assure that the insert rotates during boring about its axis in the correct direction and at sufficient speed to assure cooling of the insert.

21 Claims, 11 Drawing Sheets

METAL BORING WITH SELF-PROPELLED ROTARY CUTTERS

FIELD OF THE INVENTION

This invention pertains to boring in metals by use of self-propelled rotary cutters carried in a tool body.

BACKGROUND OF THE INVENTION

The use of self-propelled rotary cutters in machining (cutting) of metal is known in the context of turning operations in which a workpiece is rotated in a lathe. Such use is also known in the context of milling operations.

U.S. Pat. Nos. 2,233,724, 2,513,811 and 4,181,049 pertain to early and more recent examples of the use of rotary cutters in turning operations. U.S. Pat. No. 3,329,065 is an example of the use of such cutters in milling operations.

In the context of machining of metals, self-propelled rotary cutters are annular elements, often called "inserts" because of their replaceability in a suitable carrier or tool body, which are much harder than the metals which they are used to cut. The cutter inserts can be provided in various geometries, but flat washer-like geometries are common and are often favored because their simple geometry is related to reduced cost. A cutter insert is carried in a tool body for rotation about the cutter axis. Either by suitable design of a milling tool body and how it rotatably carries the cutter, or by appropriate positioning of the tool body with its cutter relative to a rotating workpiece in a turning lathe, a circumferential cutter face and an adjacent edge on the cutter element are placed in a desired position relative to a workpiece to be turned or milled. That desired positional relation between the cutter and the workpiece during cutting operations, in which one or the other of the tool and the workpiece are rotated relative to each other and the cutter is moved into the workpiece, causes the friction between the cutter and the workpiece to rotate the cutter about its own axis. That friction is the friction between the cutter and chips of metal formed by forceful contact between the cutter and the workpiece. As the cutter turns about its axis, new portions of the cutter face and edge move into cutting contact with the workpiece, while those portions of the face and edge which have moved out of that contact are able to cool before recontacting the workpiece. That ability of a rotating cutter to stay much cooler than a nonrotary cutter under comparable machining conditions gives a rotary cutter a significantly longer useful life than a nonrotary cutter.

Notwithstanding suggestions in some literature about the utility of self-propelled rotary cutters in boring operations, so far as is known such cutters have actually been used to date only in turning and milling operations. As will be noted more fully in the following detailed description of an exemplary boring tool having self-propelled rotary cutters, turning and milling operations have much in common with each other in terms of how they apply forces to rotary cutter inserts, while boring operations present a meaningfully different regime and set of cutter insert loading conditions and effects. Those differences, and an apparent lack of understanding of them, have presented a barrier to the successful and effective use of self-propelled rotary cutters in metal boring operations.

Metal boring is different from drilling. Boring presumes the presence in a workpiece of a roughly circularly cylindrical hole, cavity or passage the walls of which are to be machined to provide a more cylindrical hole, e.g., having a specified diameter and a desired surface finish. Boring is the operation used to achieve those objectives. Drilling, on the other hand, generally presumes that the workpiece has no hole, cavity or passage in the place of interest; drilling can be the operation used to create such a hole, cavity or passage of specified diameter and, if appropriate, desired surface finish. Bores usually have ratios of diameter-to-length which are much greater than the holes, e.g., created by drilling.

Metal boring operations increasingly present machining conditions in which self-propelled rotary cutters could be used to great advantage but have not been so used to date. For example, in the automobile industry, many factors, notably desires for increased fuel efficiency through the use of lighter vehicles, are stimulating automobile manufacturers to produce engines made predominately of aluminum or other light-weight alloys or other materials (such as compact graphite iron, a special form of cast iron) which enables the engine block to be lighter overall. Aluminum is attractive because it is light and comparatively inexpensive. Aluminum, however, is not known for its wear resistance, especially at high temperatures, unless it is specially, and expensively, alloyed with other materials.

Automotive engine blocks are formed initially by casting processes and then by finish machining processes including drilling, tapping, milling, boring and other machining processes. If cast aluminum is used to form the raw engine block, the walls of the cylinder bores in those engines often are defined by a sleeve of metal which has high wear resistance at high temperatures. The cylinder walls can be formed by machined sleeves inserted into a machined engine block or, more preferably, by generally tubular pieces of such wear resistant material around which the aluminum engine block is formed in the casting of the block. In the latter situation, a desirable material to use in forming the cylinder insert is compacted graphite iron, or "CGI." CGI is a very difficult material to machine due to its high tensile and shear strength which must be overcome by a cutter during machining. To date, so far as known, CGI has not been used as cylinder insert material in production automotive engine blocks. Gray iron (cast iron) is the most common material from which production engine blocks are cast and in which cylinder bores are machined.

Transfer lines are widely used in the production of a finish machined automotive engine block from a raw engine block casting. A transfer line includes a series of machining stations, through which an engine block passes in sequence, and at which one or a few particular machining operations are performed on a block casting. Modern transfer lines are highly automated. Raw block castings are loaded, manually or by robots or other mechanisms into one end of a transfer line and finish machined blocks are unloaded in a similar manner from the other end of the line. Between the ends of a transfer line, the blocks normally are not touched by human hands. Transfer lines function most efficiently when the need to replace worn or dull metal cutting elements at the several machining stations is minimal. Heretofore, when engine blocks have been handled in automated machining transfer lines, the cylinder boring operations frequently, if not commonly, are the operations which limit overall transfer line efficiency. The reason is the need to comparatively frequently replace boring tools in which the metal cutting elements are fixed in the tools and have a short useful life because of the high temperatures they experience as they are used continuously. It is quite common for modern automated transfer lines to have two successive cylinder boring stations, for rough and semi-finish boring respectively, followed by a cylinder honing station. Thus, cylinder boring of engine blocks long has been a troublesome matter in the automobile industry.

In view of the foregoing, it is seen that a significant need has long existed, in the manufacture of light-weight automotive engines in automated transfer lines, among other contexts, for the benefits of self-propelled rotary cutters in metal boring operations. The aspects of this invention which make it useful to the automotive manufacturing industry also make the invention useful in other industries which practice metal boring processes.

SUMMARY OF THE INVENTION

This invention beneficially addresses the need identified above. It does so by providing, among other things, a boring tool for metal machining use in which the cutting surfaces and edges of the tool are surfaces and edges of self-propelled rotating cutter inserts. The inserts are carried in a boring tool body in positions which enable them to rotate in correct directions at desired velocities sufficient to assure adequate cooling of the cutting surfaces and edges as boring progresses at correlated feed rates and cutter surface speeds.

Generally speaking, a structural aspect of this invention is a boring tool which has a body that is rotatable about and advanceable along a primary tool axis during boring. The tool body carries a rotating round cutting element mounted to the body for rotation about a secondary axis which is fixed relative to the primary axis. The cutting element has a circular cutting edge which bounds a cutting surface. The cutting surface generally faces toward the direction of boring rotation of the tool body, i.e., toward the direction in which the tool is advanced relative to a workpiece as the tool is used to bore the workpiece. The relation of the primary and secondary axes is defined so that, at a cutting location on the element located at the place of maximum distance of the cutting edge radially from the primary axis, the cutting surface has radial and axial rake angles relative to the primary axis. The radial and axial rake angles are defined relative to each other to assure rotation of the cutting element in a selected direction about the secondary axis with at least a selected amount of torque during boring use of the tool.

Another structural aspect of this invention is found in a cutting element mount for a round rotatable cutting element useful in a boring tool. The tool has a body which is rotatable about and advanceable along a tool axis during boring. The mount includes a base and an annular rotatable cutter element rotatably carried by the base for rotation about a cutter axis. The cutter element has a face which extends substantially radially of the cutter axis and also a peripheral cutting edge which bounds the surface. The mount includes structural features by which the mount is rigidly connectible to the tool body in a predetermined relation to the body. That relation is one in which the cutter element surface opens toward the direction of boring rotation of the tool body about its axis. That relation also is one in which the element cutting surface has selected axial and radial angles of rake relative to the tool axis at a cutting location on the element. The element cutting location is the place of maximum distance of the cutting edge from the tool axis. The radial and axial rake angles have values which assure rotation of the cutter element about the cutter axis in a selected direction with a selected amount of torque in boring operation of the tool.

A procedural aspect of this invention provides a method for machining a bore of specified diameter in a workpiece of specified material with a self-propelled rotating cutter element. The method includes the step of defining, with reference to the properties of the specified material, first operating values for element cutting speed, depth of cut and axial feed rate. The method includes the step of establishing for those first operating values the relations of cutter element axial and radial rake angles to tangential, radial and axial cutting forces and cutter element torque. The method also includes identifying cutter element rake angles for maximum torque in a desired direction about the cutter element's axis of rotation, and establishing cutter element bearing forces at the identified rake angles. A rotatable boring tool is provided having a cutting point spaced radially from the tool axis a distance equal to one-half the specified bore diameter, and having the identified axial and radial rake angles at the element cutting point. That tool is operated at an angular velocity productive of the defined cutting speed and at the defined axial feed rate on the workpiece to machine the bore.

DESCRIPTION OF THE DRAWINGS

The foregoing and other features and benefits of this invention are more fully set forth in the following detailed description of presently preferred embodiments of the invention presented with reference to the accompanying drawings in which:

FIG. 11: tangential cutting force in pounds;

FIG. 12: radial cutting force in pounds;

FIG. 13: axial cutting force in pounds;

FIG. 14: insert torque in pound-inches; and

FIG. 15: insert speed in revolutions per minute.

In all instances, the cutting speed is 2641 surface feet per minute, (805 M per minute), the depth of cut is 0.0157 inch (0.40 mm), and the feed rate is 0.006 inch (0.15 mm) per tooth. A tooth is a cutting edge in the tool. The feed rate per tooth is the overall tool advance rate per turn divided by the number of cutting edges in the tool.

DETAILED DESCRIPTION OF THE INVENTION

Figure 1:
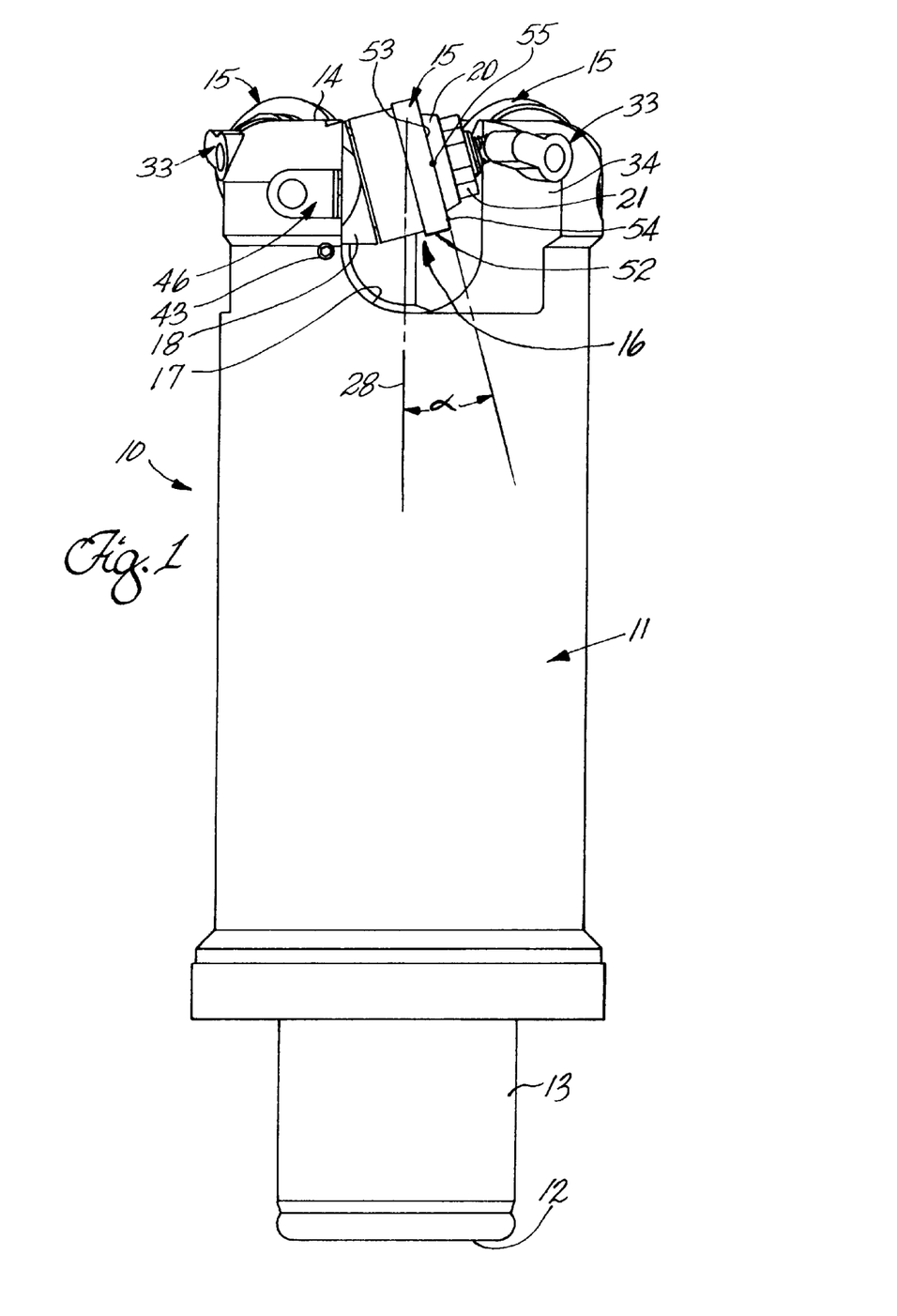
FIG. 1 is a side elevation view of a boring tool having self-propelled rotary cutters at its top end.

FIG. 1 is a side elevation view of a boring tool 10 according to this invention. The tool has a body 11 which has a spindle end 12 adjacent to which the body defines a base 13 which is the portion of the tool which is held in the driven rotary spindle of a suitable boring machine or machining center (not shown). If the tool is to be used in a machining center which includes mechanisms for automatically changing tools between the occurrence of different machining operations performed by the center, tool base 13 incorporates such structural features as are necessary to achieve proper registration, engagement and indexing with and in the center's tool handling mechanisms. By way of example, the geometry of the base 13 of the tool shown in FIG. 1 conforms to the requirements for tool shank configurations and machine tool spindle designs according to the ABS 80 criteria. The tool body also has an opposite boring end 14. Commonly the boring end 14 of tool 10 is its lower end during use of the tool in metal boring operations. In boring operations, the walls of an existing generally circularly cylindrical hole or cavity in a metal workpiece (such as an automotive engine block) are machined (cut away) to define a truly circularly cylindrical wall surface of specified diameter determined by the geometry of the boring tool at the location of its metal cutting element(s).

At its boring end 14, tool 10 rotatably carries three rotating cutter elements 15 which are also referred to herein as cutter or cutting members and which are commonly known in the machining industry as inserts. The cutter elements 15 are defined of a material which is much harder than the metal which the elements will engage during boring use of the tool; a preferred cutter element material is silicon nitride, a ceramic material.

Figure 2:
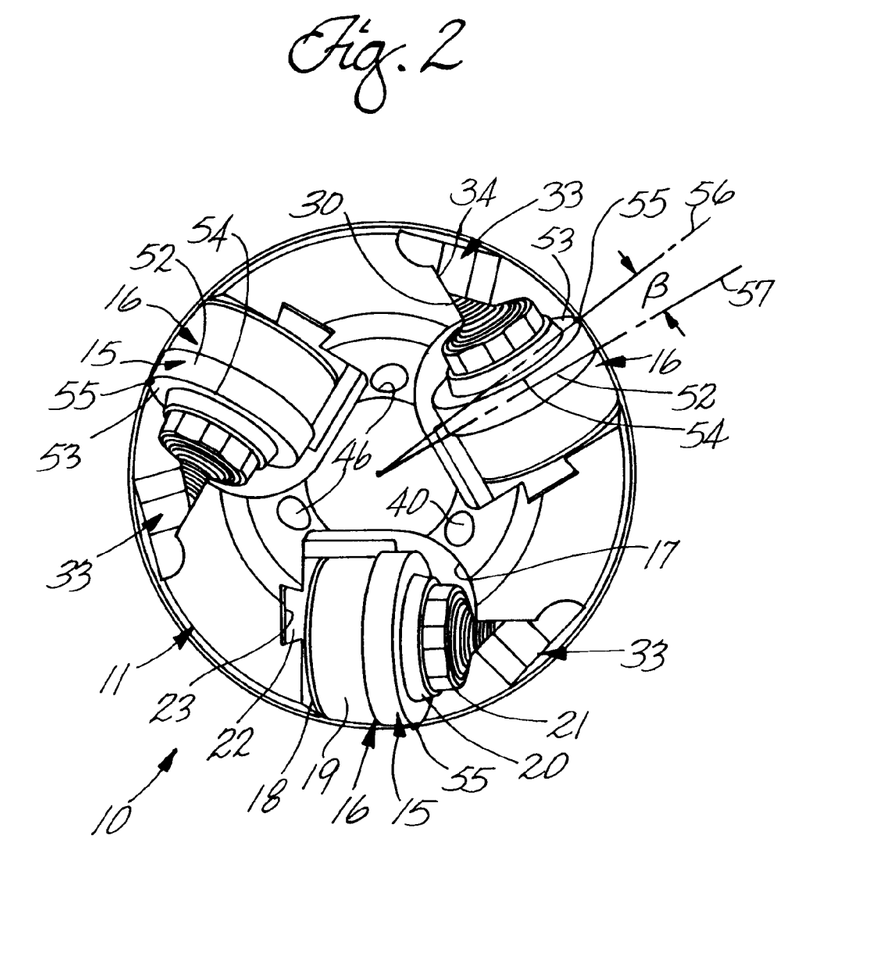
FIG. 2 is a top plan view of the boring tool.

As shown in FIGS. 1 and 2, tool 10 carries each cutter element as a component of a cutter element mount 16 which is in the form of a cartridge. Each cartridge is readily insertable into and removable from the tool body to facilitate efficient replacement in the tool of worn cutter elements and to facilitate substitution of other cartridges within the capacity of the tool and useful to machine bores of different diameter. Cutter cartridges 16 are identical and, in the form shown, are generally in accord with the disclosures of U.S. Pat. No. 4,477,211, which disclosures are incorporated herein by reference. Each cartridge includes a base 18 (also called a stator) and also a rotor 19, a cutter insert 15, a chip deflector 20 and a clamp nut 21 which are mounted on a shaft 24 (see FIGS. 3 and 4) defined by the stator. Although not shown herein but in accord with U.S. Pat. No. 4,477,211, the rotor preferably is coupled to the stator shaft by a thrust bearing, a needle bearing and a ball bearing. Those bearings are located between the stator and the rotor to rotatably mount the rotor on the stator and to transfer to the stator axial loads applied to the rotor by the cutter insert during boring. The stator shaft in effect forms an axle about which the cutter insert can rotate. The clamp nut is connected to the stator shaft via thread 25 (see FIGS. 3 and 4) formed in the end of the shaft spaced from the large end of the shaft. Threads 25 preferably have a handedness which is opposite to the handedness of the direction in which the cutter insert rotates about the stator shaft during boring. Thus, in tool 10, inserts 15 rotate clockwise (i.e., in a right-hand direction) about the stator shaft when viewed along the shaft axis from the threaded end of the shaft, and so threads 24 are left-handed threads.

Figure 3:
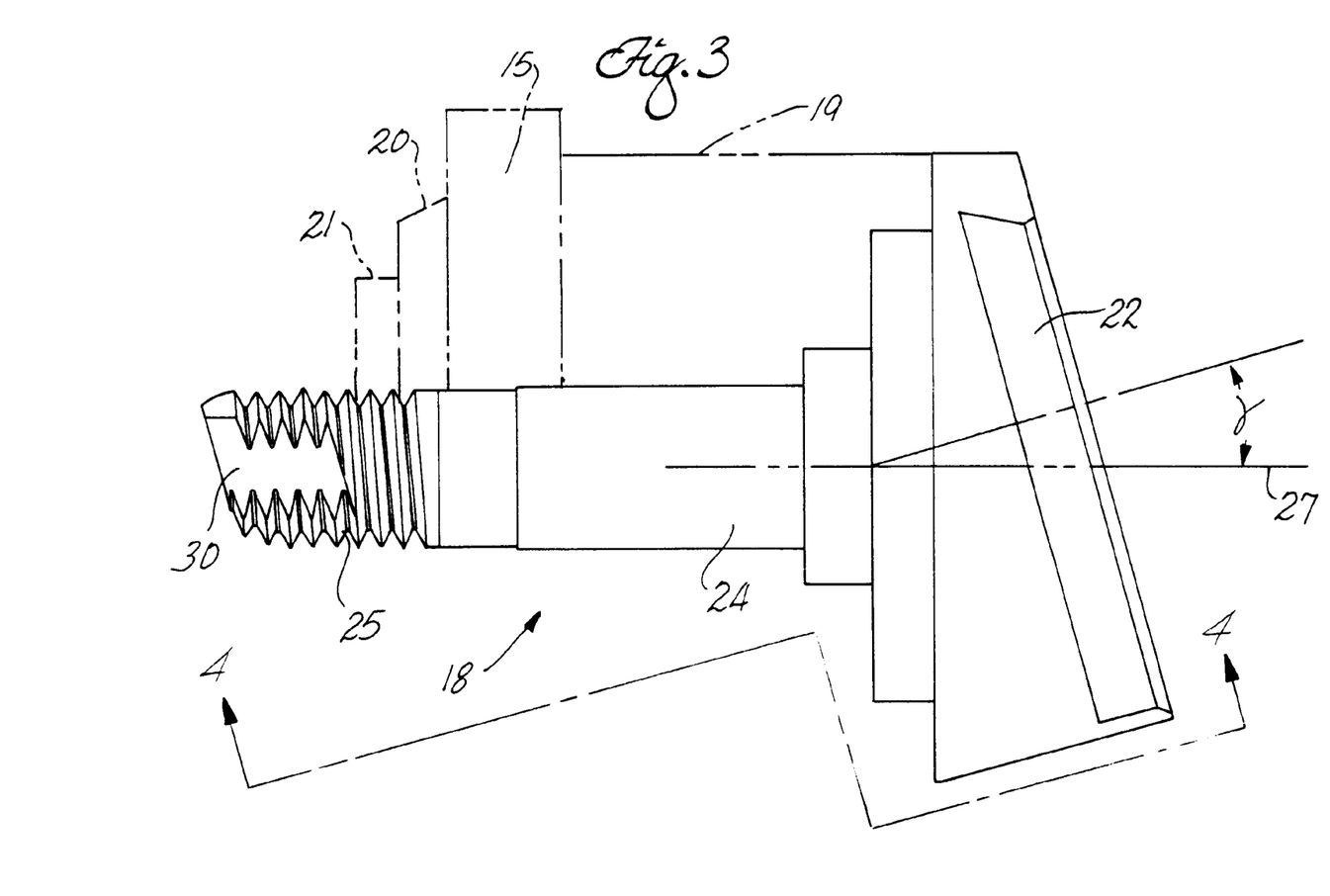
FIG. 3 is an elevation view of a rotary cutter mount base, three of which are components of the tool shown in FIGS. 1 and 2, with a rotary cutter insert and other components of the mount shown fragmentarily.

The cutter cartridge stator 18 is readily mountable in and demountable from tool body 11 by virtue of presence in the stator of structural features which afford those benefits and which also cause the stator axis 27 to have a predetermined fixed position in the tool body relative to the central axis 28 of the tool body. A presently preferred set of such structural features includes a rib-like male dovetail connection moiety 22 defined in the face of the stator which is opposite from threads 25. The male dovetail rib 22 coacts with a groove-like female dovetail connection moiety 23 (see FIG. 2, e.g.) formed in the rear face of a respective recess 17 in the tool body. The centerline of each female dovetail groove conventionally and preferably is parallel to tool axis 28. However, the centerline of the male dovetail rib 22 is not, in most instances, perpendicular to the stator shaft axis 27, but is out of perpendicular to that axis by an angle γ which, under the circumstances described, defines (and is equal to) the axial rake angle a of the respective cutter insert as carried by the tool body. This is shown in FIG. 3 which is an elevation view of the cartridge stator looking at the side of the stator which faces toward tool axis 28 when the stator is mounted in the tool via dovetail connection 22, 23. The position occupied on the stator by rotor 19, cutter insert 15, chip deflector 20 and clamp nut 21 are represented by broken lines in FIG. 3.

Figure 4:
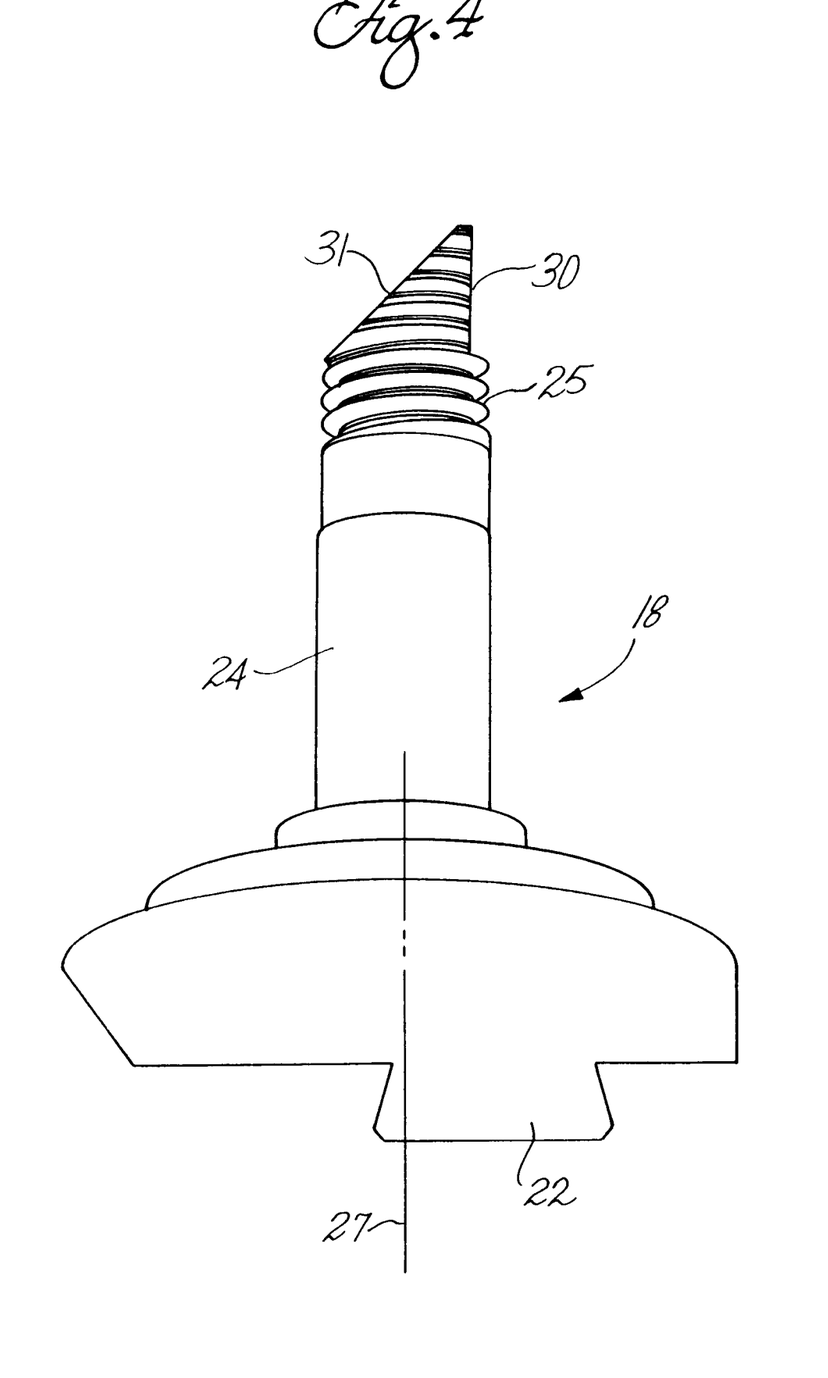
FIG. 4 is an elevation view of the mount base taken along line 4—4 in FIG. 3.

FIG. 4, which is a view of a cartridge stator 18 taken along line 4—4 in FIG. 3, shows that the male dovetail rib preferably is not centered on the stator axis (i.e., axis 27), but is laterally offset from that axis toward the side of the stator shown in FIG. 3. That offset enables each dovetail groove 23 to be defined in the tool body at a place which is sufficiently inward from the circumference of the tool body in the vicinity of a recess 17 to assure a strong connection of the stator base to the tool body, and also enabling the stator shaft to be comparatively far from tool axis 28 so that the diameter of cutter insert 15 can be kept low consistent with the diameter of the bore it will cut during boring use of tool 10. The offset of the male dovetail rib 22 from axis 27 also provides a robust structural feature at the extreme threaded end of the stator shaft to enable the shaft end to be effectively clamped to the tool body as shown in FIGS. 1 and 2 and as described below.

Figure 9:
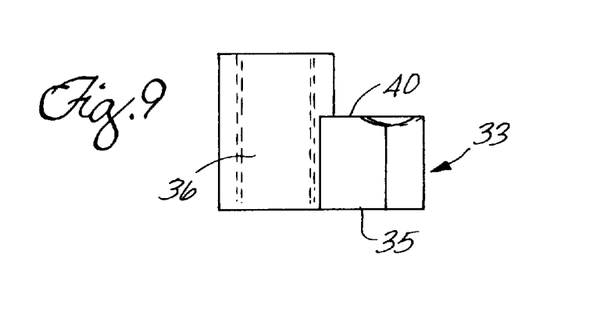
FIG. 9 is a top plan view of a front mount lock member.
Figure 10:
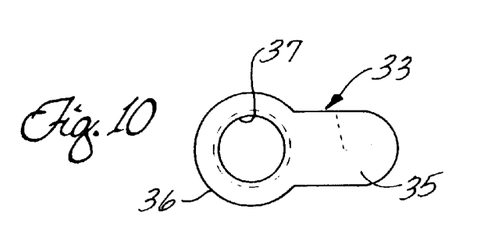
FIG. 10 is an elevation view of the front mount lock member.

Further components of the structural features of the stator which enable the position of the stator axis 27 to be fixed relative to the tool axis 28, when the stator is mounted to the tool body, include two preferably flat surfaces 30 and 31 formed in the stator shaft in the portion of the shaft which defines thread 25; these surfaces are shown best in FIGS. 3 and 4. These surface cooperate with a front clamp dog member 33 shown in FIGS. 9 and 10 and in its installed location in FIGS. 1 and 2. Stator shaft end surface 30 preferably is parallel to shaft axis 27 and parallel to the elongate length of dovetail rib 22. Its position in the stator is determined in cooperation with the shape of a tool body cartridge recess 17 so that, when a cartridge is mounted in the recess via the dovetail connection, surface 30 lies against a flat surface 34 of recess 17. Surface 31 is angled relative to surface 30 in generally wedge-like cooperation with surface 30. As shown best in FIG. 2, surface 31 is engaged by a rearward (relative to the direction of boring rotation of tool 10) tongue extension 35 of a corresponding front dog member in the fully assembled boring tool. A front clamp dog member has a generally tubular body 36 from which extension 35 extends preferably radially; the extent of the extension in the direction of the length of body 36 is less than the body length from one end of the body. A tapped hole 37 is formed axially in the dog body 36.

Figure 5:
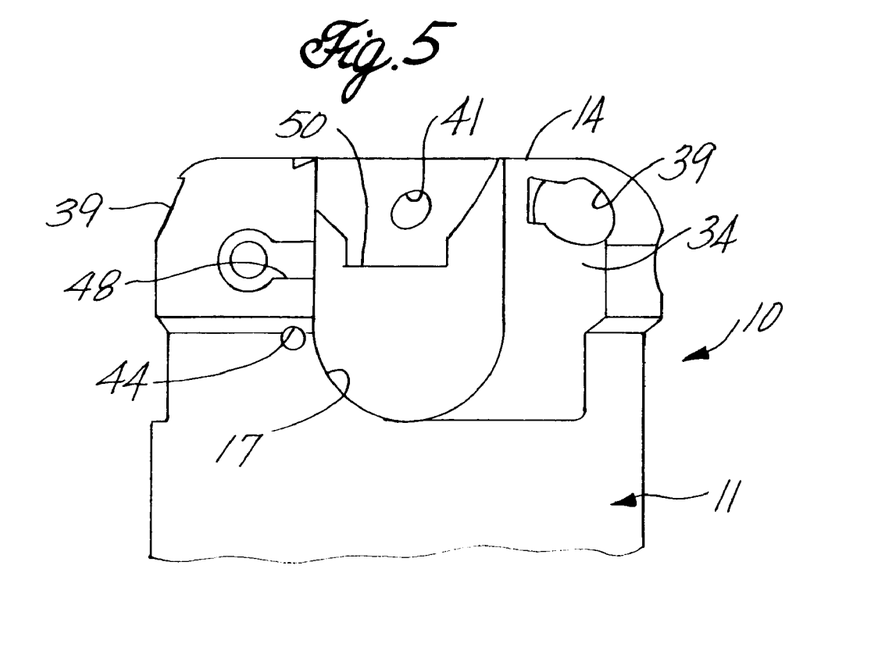
FIG. 5 is a fragmentary elevation view of the body of the boring tool without the cutter mounts in the body.
Figure 6:
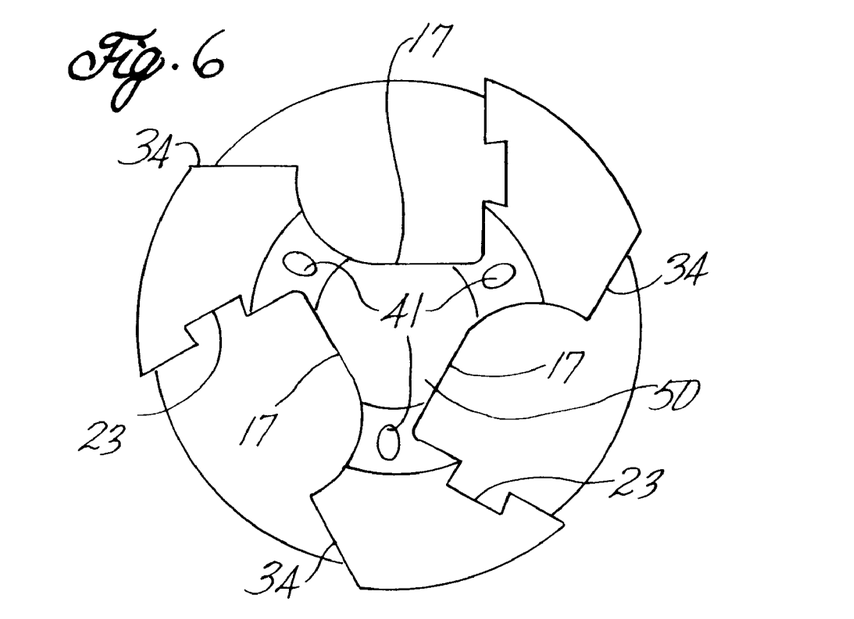
FIG. 6 is a top plan view of the tool body.
Figure 7:
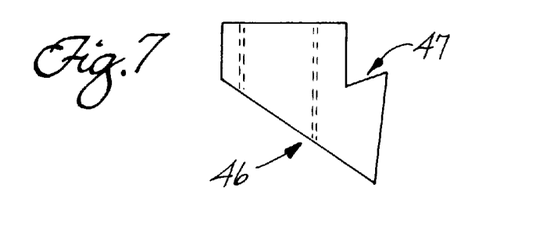
FIG. 7 is a top plan view of a rear mount lock member.
Figure 8:
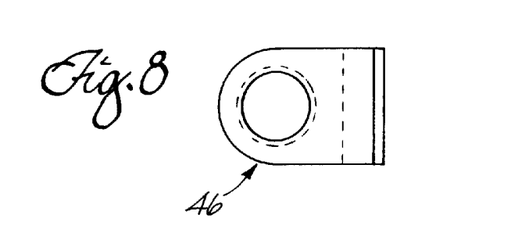
FIG. 8 is an elevation view of the rear mount lock member.

In an assembled boring tool 10, a front clamp dog member is received in a cavity 39 formed in the tool body substantially in recess surface 34; see FIG. 5, e.g. Cavity 39 is contoured so that a dog member placed in it cannot rotate and has its extension 35 registered with surface 31 of the corresponding cutter insert cartridge. The front clamp dog member is secured in the tool body by a screw (not shown) with the inward surface 40 of the dog extension forcibly engaged with stator end surface 31 to clamp the end of the stator shaft against the tool body in recess 17. The screw used to secure clamp dog 33 in cavity 39 engages the tool body in a tapped hole 41 formed in the body at the bottom of the cavity.

The correct position of a cutter insert cartridge 16 axially of tool body 11 is defined by a positioning pin 43 (FIG. 1) which is held in a hole 44 formed in the tool body. Hole 44 traverses the corresponding dovetail groove 23, as does the pin located in that hole. The pin acts as a positioning stop for the dovetail rib when the cartridge is inserted into the tool body via the dovetail groove. That is, the pin 43 engages the end of the dovetail rib at the end of the rib which is shown in the lower right corner portion of FIG. 3. Because the dovetail groove 23 in the tool body has its elongate extent disposed parallel, or substantially so, to the tool rotational axis 28, the cooperation of a pin 43 with the cartridge dovetail rib structure defines the limit of movement of the cartridge into the tool body along tool axis 28. That limit, depending on the length of the dovetail rib 22 in the cartridge, in turn establishes the location of that cartridge's cutting point 55 along tool axis 28.

The dovetail rib of a cartridge is clamped to the tool body by the action of a rear clamp dog member 46 which is generally similar to the respective front clamp dog member 33 but has its extension undersurface 47 sloped to mate against a sloping sidewall of the adjacent cartridge dovetail rib. Each rear clamp dog member is received in a respective cooperatively contoured cavity 48 formed in the exterior side surfaces of the tool body rearwardly of each cartridge recess. Each dog member 46 is held in its cavity by a screw (not shown) which cooperates with the dog member and the tool body in the manner previously described for the front clamp dog members.

The boring end 14 of tool body 11 is centrally recessed, as at 50. Recess 50 has partial communication to the adjacent cartridge recess 17 and can accommodate metal chips generated during boring use of tool 10.

While cutting inserts of various geometries can be used in a boring tool according to this invention, tool 10 is arranged to use annular round inserts having a circularly cylindrical outer circumferential surface 52 and flat parallel major face surfaces, including a front cutting or rake surface 53, perpendicular to the corresponding cartridge axis 27 which can be referred to as cutter axis or as a secondary axis relative to a primary axis colinear with tool axis 28. Cutting inserts 15 are such inserts. The circular line of intersection of insert circumferential surface 52 with cutting surface 53 forms the cutting edge 54 of the insert. The point 55 on cutting edge 54 which has the farthest distance from the tool axis 28 is the idealized cutting point of the insert during boring, as it is that point which determines the diameter of the cylindrical surface bored by that insert as the boring tool is rotated and axially advanced during boring.

The terms "axial rake" and "radial rake" have been used to identify certain important geometric relationships in metal cutting tools using self-propelled rotary (rotating) cutter inserts. Axial rake is negative when the cutter axis generally points toward the workpiece; in the context of a boring tool, toward the workpiece means toward the direction of axial advance of the tool. Axial rake is evaluated from a vantage point located on a line radially from the tool axis, thereby eliminating the effects of radial rake. Axial rake is measured by the angle which the tool axis makes with the plane of the cutting face at the location of the cutting point 55 on the cutting face 54, i.e., by angle $\alpha$ shown in FIG. 1 which is the same in value as angle $\gamma$ shown in FIG. 3. Radial rake is evaluated from a vantage point on the tool axis looking at the boring end of the tool; such vantage point eliminates the effects of axial rake. Radial rake is measured as the included angle between a radius 56 from the tool axis through the cutting point (as one limit of the angle) and a plane 57 which includes the tool axis and is perpendicular (as seen from the radial rake vantage point) to the cutter insert axis of rotation, i.e., the cutter axis (as the other limit of the angle). Radial rake is negative if the cutting point is displaced toward the direction of tool rotation from the plane which is perpendicular to the cutter axis and which defines the second limit of the radial rake angle. The radial rake angle $\beta$ is shown in FIG. 2 and is negative in tool 10.

As noted above, a significant benefit of metal cutting tools having cutting edges and faces which move in the cutting tools, as compared to tools in which those edges and faces are stationary in the tools, is a much longer useful life under comparable machining conditions, inter alia, of metal, depth of cut, feed rate and speed of the tool in its movement relative to the metal of the workpiece. That longer life is provided by the movement of the cutting edges and faces in the tools and by the cooling of those edges and faces as their different portions cyclicly move out of and back into cutting engagement with the workpiece. For those cutting edges and faces to most effectively remove metal from the workpiece, they should move in the correct direction relative to the workpiece and at a speed which is consistent with often-competing practical considerations; too slow produces unnecessary heating and too fast presents other issues. Thus, it has long been recognized that the optimum design of machining tools having self-propelled rotary cutter inserts involves many variables which are related to each other in poorly understood complex ways. If an optimum geometrically determined design can be achieved, it may be impossible to embody that design in a cutting tool of suitable size in which the tool and its components have sufficient structural strength to last (i.e., stay together) for an acceptable time under actual machining conditions. As a consequence of these many competing factors, the design of a commercially acceptable rotary insert metal cutting tool is an exercise in compromises and trade-offs made on the basis of practical experience.

It is known that cutting insert rotation is generated by the friction between the insert and chips created in the machining process as the chips flow across the cutting face of the insert. That rotation is affected, in each individual machining situation, by the axial rake angle and the radial rake angle of the insert. As metal cutting occurs, three orthogonally related cutting forces are generated. In the context of a boring tool, such as tool 10, the cutting forces applied to an insert can be idealized as being applied at its cutting point. Those forces are an axial force which acts on the insert in a direction parallel to the tool axis (e.g., axis 28), a radial force which acts on the insert in a direction which coincides with a radius of the tool, and a tangential force which is perpendicular to both of the radial and axial forces at the insert cutting point. Those forces must be accommodated in the physical structure of the tool and they must result in a torque being applied to the insert in the desired direction (i.e., the direction in which the insert is to rotate about its axis) and with the desired magnitude. Insert torque magnitude is important to the ability of the insert to overcome the friction inherent in its mounting bearings and to turn at the desired rate.

The torque applied to a self-propelled rotating cutter insert is a function of a complex set of variables including the insert axial rake angle, the radial rake angle, the angular speed of the boring tool (i.e., its revolutions per minute), the radius of the boring tool at the insert cutting point, the radius of the cutting insert, the coefficient of friction between the insert cutting face and the chips it creates during boring, the depth of cut made by the insert, and the axial feed rate of the boring tool. Further factors which are relevant are the axial, radial and tangential forces applied to the insert at its cutting point. Those forces are related not only to the insert rake angles, but also to the properties of the metal being bored; a boring tool which works well to cut compacted graphite iron may work poorly or not at all when used to cut aluminum, and vice versa. Workpiece material properties which bear upon the machining process include tensile strength, shear strength, hardness, malleability and ductility.

The prior art has suggested that, in general, increasing the radial rake angle of a rotating cutting insert will increase the speed of the insert about its axis of rotation and increase heat dissipation of the insert. While that suggestion may be valid in the context of milling and turning machining operations, it is not true in the context of boring operations. Among other things, the location of the insert cutting point relative to the tool body is different, as are the way the cutting forces act on the insert; it has been found empirically that, in certain cases, increasing the radial rake angle in boring can cause the insert not to rotate or to reverse the direction of rotation. It has been discovered that, in boring and perhaps in other contexts, both axial and radial rake angles affect insert rotation and that, in general, the axial rake angle is about twice as significant as the radial rake angle. Changing the axial rake angle by 5 degrees has twice the effect on insert angular speed and torque generation as does a 5 degree change in the radial rake angle.

While it may appear that a workable rotating insert boring tool design would be to maximize the torque generated, serious practical difficulties can arise by doing so. As torque is increased, so are some of the reaction forces on the bearings which mount the insert in the tool body, thereby reducing tool life. Also, practical constraints arising in the tool body need to be considered. Thin cross-sections in the tool body structure are to be avoided, as they can limit the ability to securely clamp an insert cartridge in the tool body and will create high stress areas in the body. Both of these situations will affect the stability of the tool and the boring process itself.

Tool 10, described above and shown in the accompanying drawings, is designed for machining a bore in compacted graphite iron. The tool is for creating a bore having a diameter of 3.13 inches (79.5 mm.) and has a radius at its insert cutting points of one-half that dimension. The diameter of the cutting inserts is 1.062 inches (26.97 mm.). The design spindle speed is 3200 rpm, which produces a cutting speed of 2641 SFM (surface feet/minute) (805 M/minute). The design depth of cut is 0.0157 inch (0.40 mm). The design feed rate is 0.006 inch (0.15 m) per tooth. A tooth is a cutting edge in the tool. The feed rate per tooth is the overall tool advance rate per turn divided by the number of cutting edges in the tool. Each insert of tool 10 defines a cutting edge.

Figure 11:
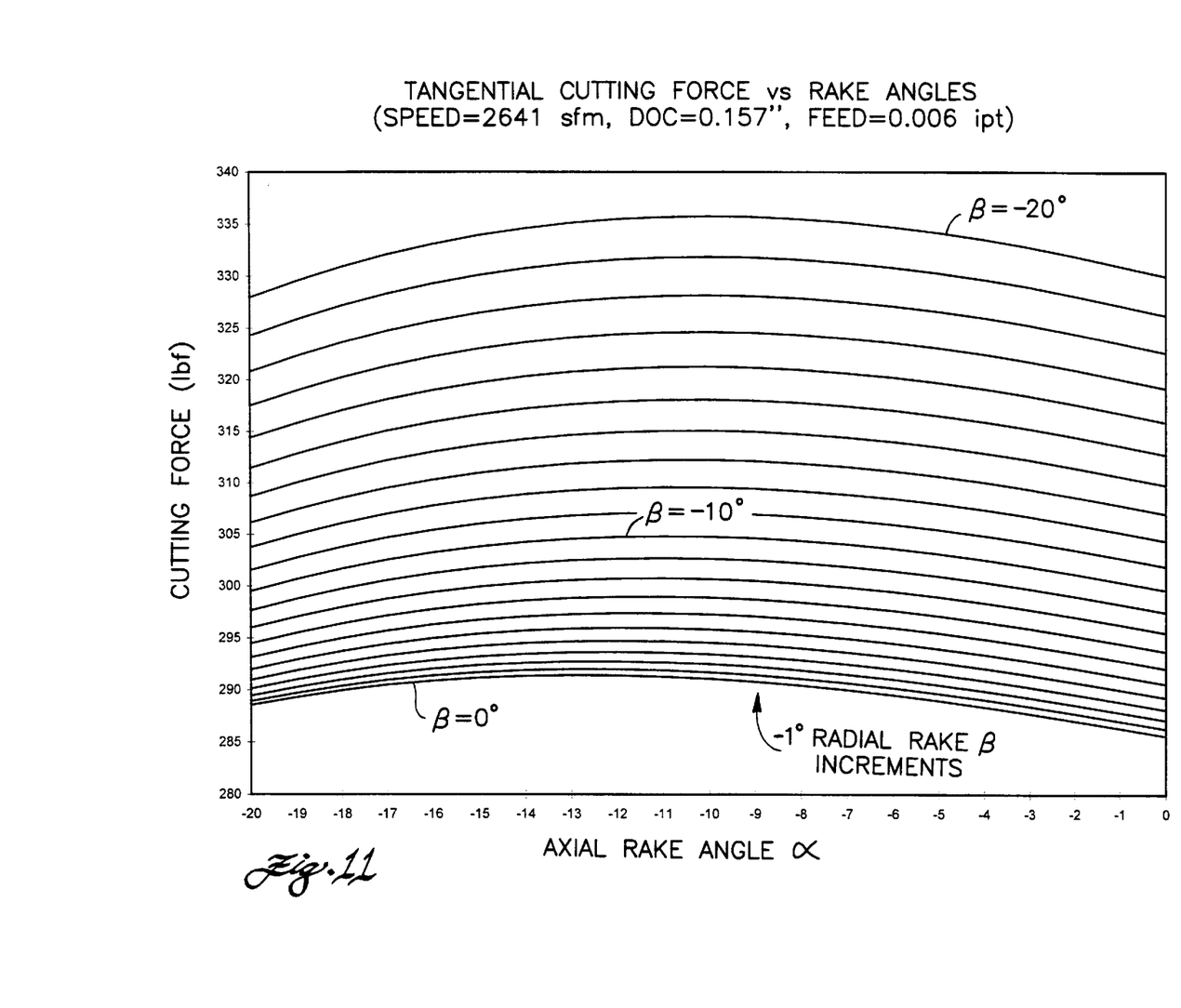
FIGS. 11–15 are graphical representations of the relations between certain variables which are relevant to the design of the boring tool shown in FIGS. 1 and 2 and to other boring tools and cutter mounts according to this invention. In each of FIGS. 11–15, the abscissa (horizontal axis) is axial rake angle in one degree increments through the range −20° (origin) to 0°. In each of those graphs, the contours are values of radial rake angle in 1° increments through the range $\beta=0°$ to $\beta=-20°$. The ordinates (vertical axis) in FIGS. 11–15 are as follows.
Figure 12:
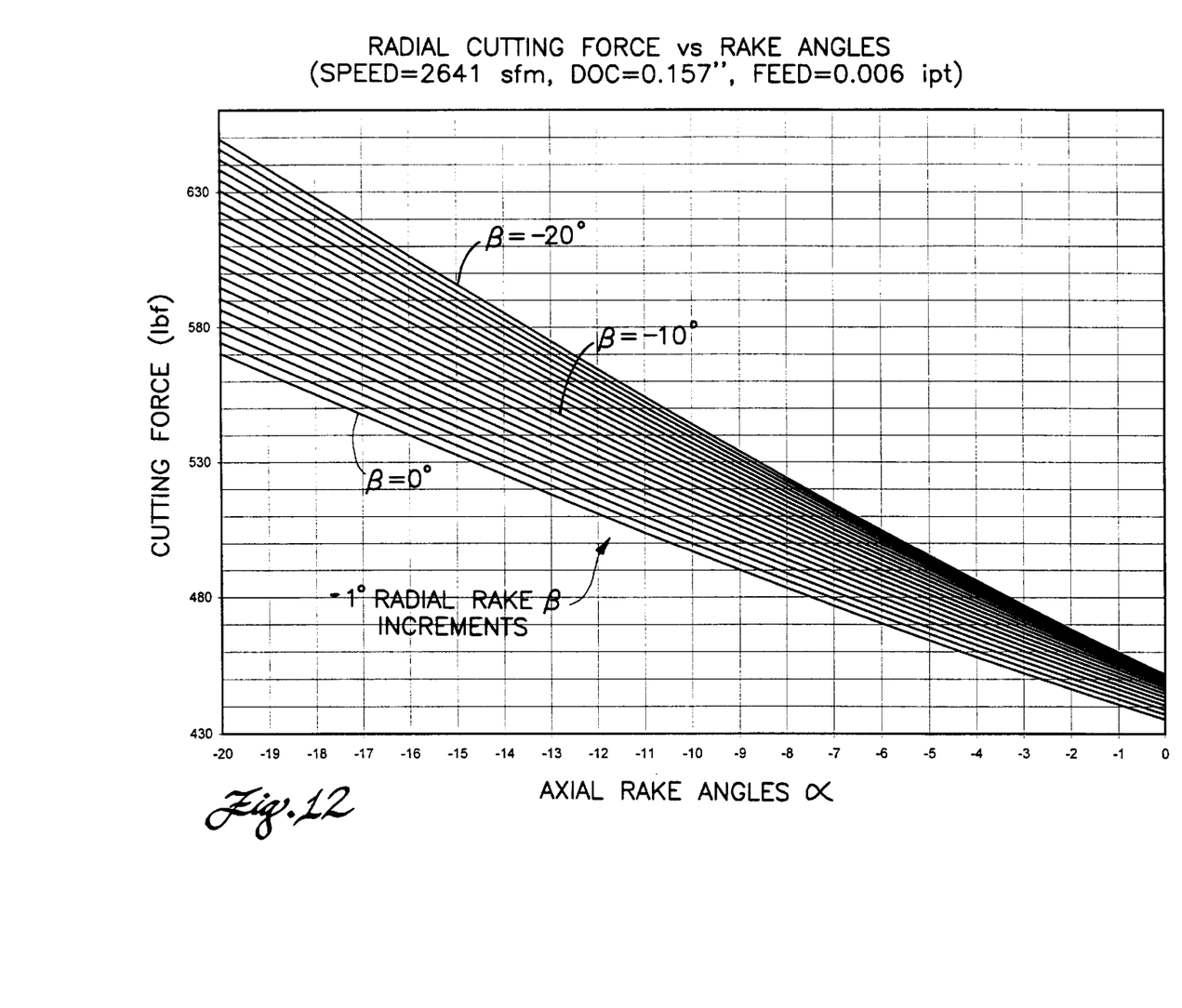
Figure 13:
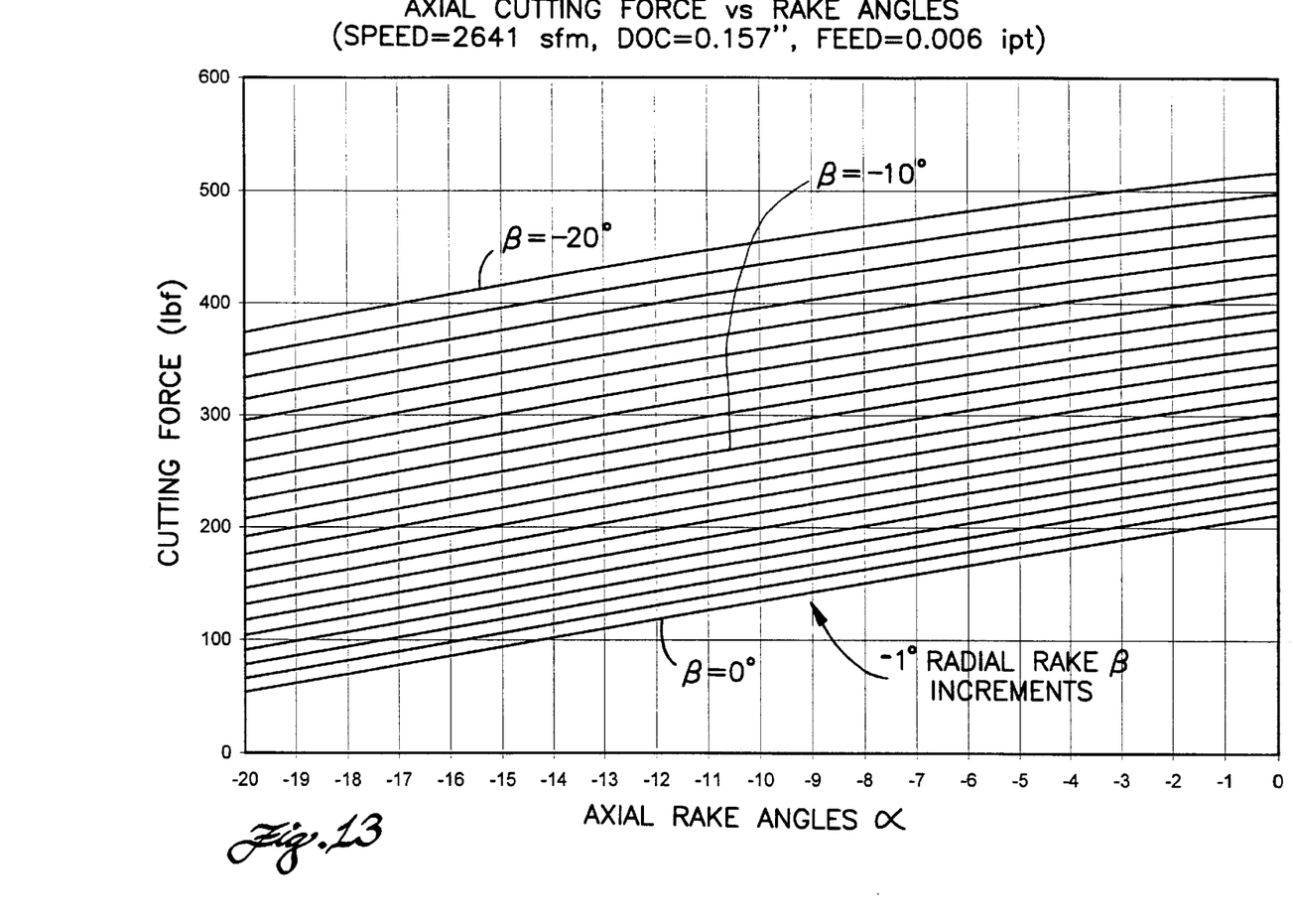
Figure 14:
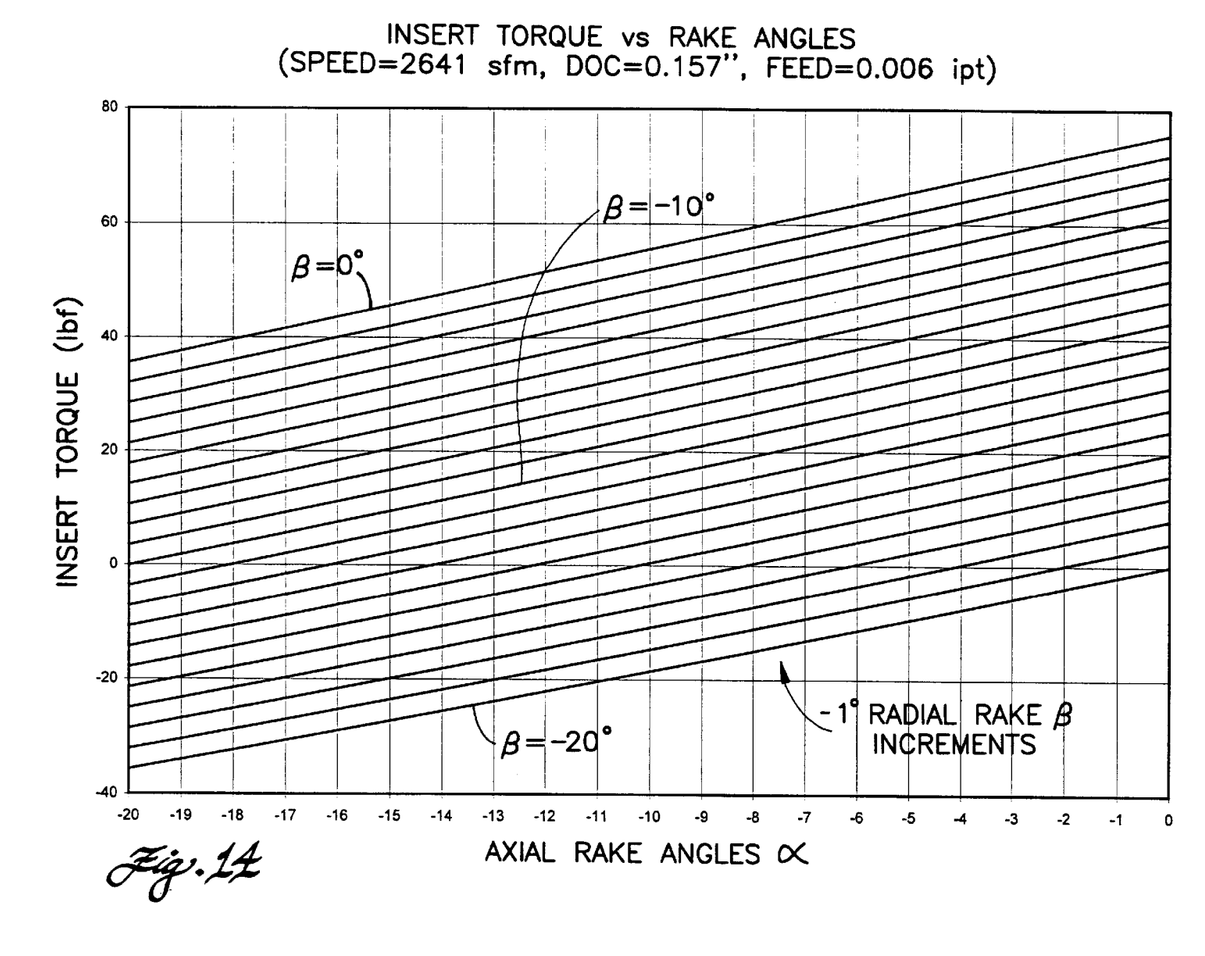
Figure 15:
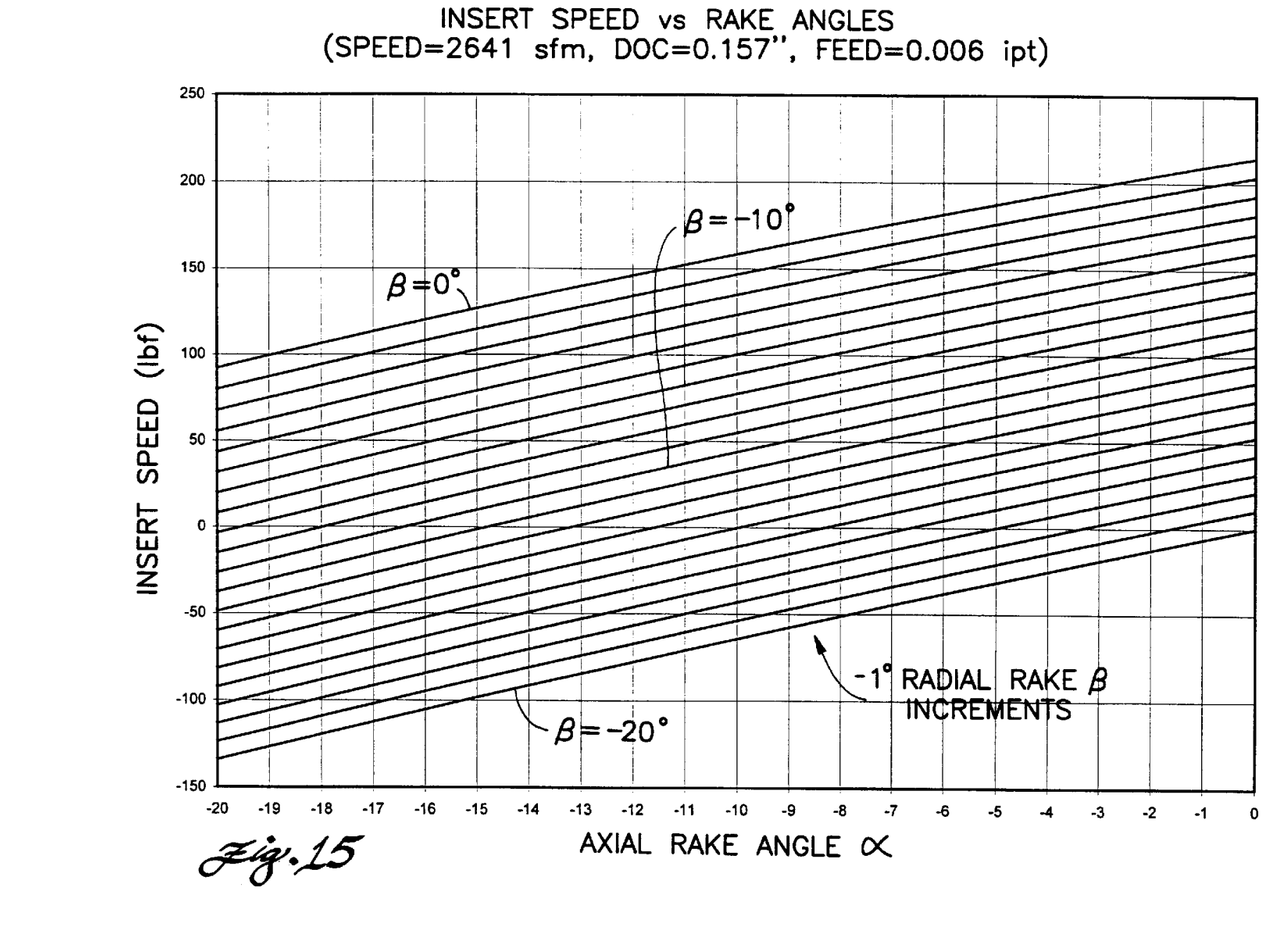

The graphs of FIG. 11–15 each describe the relations between three variables relevant to the design of tool 10. In each instance, the simultaneous variables of cutting speed, depth of cut and feed rate are constant at the values stated above. FIG. 11 describes the relation between tangential cutting force and axial and (ordinate) in pounds and axial rake angle $\alpha$ (abscissa) for different values of radial rake angles in the range $\beta=0°$ to $\beta=-20°$ in 1° increments. FIG. 12 describes the relation between radial cutting force (ordinate) in pounds and those axial (abscissa) and radial (contours) rake angles through the same ranges (and the same increments) of those angles. FIG. 13 describes the relation between axial cutting force and those (ordinate) in pounds and those axial (abscissa) and radial (contours) rake angles through the same range of radial rake angles. FIG. 14 describes the relation between insert torque and those (ordinate) in pounds-inches over the same range (and increment amount) of axial (abscissa) and radial (contours) rake angles. FIG. 15 describes the relation between insert speed (RPM) and those over the same range (and increment amount) of axial (abscissa) and radial (contours) rake angles. The material to be bored is compacted graphite iron. By use of the data in FIGS. 11–15, and by evaluation of bearing forces and by evaluation of tool structure constraints through the use of finite element analysis, an axial rake angle of –15 degrees and a radial rake angle of –7.5 degrees were established. Establishment of those angles included determination of the rake angle combination to maximize insert torque, analysis of the three cutting forces for the angle combination, and verification that tool body and insert mount constraints were respected. Workers skilled in the art will recognize that, while those processes are interactive in nature, they are not burdensome and, with knowledge of the relations described in FIGS. 11–15, readily lead to a workable, buildable and sound boring tool design.

A force simulation model can be used to determine the rake angles for the cutter inserts. The model can generate the cutting forces, insert torque and insert rotational speed with respect to the rake angles. FIGS. 11–15 were obtained by use of such a force simulation model and illustrate trends. It will be noted that not all of the relations between these variables are linear.

Workers skilled in the art also will readily recognize that boring tools for use with other workpiece materials and under other operating conditions can be defined consistent with the foregoing descriptions. They will readily appreciate that boring tool structural arrangements different from those described and shown can be adopted. For example, the equality of angle $\gamma$ in FIG. 3 to angle $\alpha$ in FIG. 1 (axial rake angle) is a consequence of the plane of dovetail connections 22, 23 being located parallel to tool axis 28, and that different dovetail plane relations to the tool axis will result in different values of $\gamma$ for the same value of $\alpha$ and, with reference to FIG. 4, even a non-normal (other than perpendicular) relation of cartridge shaft axis 27 to the dovetail plane is possible. Further, connections other than dovetail connections can be used to connect a cutting insert mounting cartridge to the tool body. The mounting of a cutting insert to a boring tool body can be accomplished more directly, but perhaps less conveniently, than by use of a cartridge; the axle about which an insert rotates in use can be fixedly defined or carried by the tool body, and a cutting insert can be releasably mounted on that axle with suitable bearings.

A cutter insert can have a geometry different from the preferred geometry of inserts 15 in a boring tool according to this invention. The insert peripheral surface and its cutting face can be other than circularly cylindrical and flat, respectively, as convenient or desired. A boring tool can take the form of a boring bar in which a cutting insert is mounted for adjustment of the position of its axis of rotation so that the axial and radial rake angles of the insert and the effective radius of the bar at the insert cutting point can be varied for different bore diameters or workpiece materials.

Workers skilled in the art also will appreciate that the foregoing description and the accompanying drawings pertain most directly to a particular boring tool which is the presently preferred embodiment of this invention. Those workers will appreciate that the description and drawings are not an exhaustive catalog of all of the forms and ways by which structures and procedures of this invention can be embodied, and that variations of and changes in those structures and procedures can be practiced without departing from the scope of this invention.

What is claimed is:

1. A boring tool comprising a body rotatable about and advanceable along a primary axis during boring and carrying a round rotating cutting element mounted to the body for rotation about a secondary axis fixed relative to the primary axis, the cutting element having a circular cutting edge which bounds a cutting surface facing generally toward the direction of boring rotation of the body, the relation of the primary and secondary axes being defined so that, at a cutting location on the element located at the place of maximum distance of the cutting edge radially from the primary axis, the cutting surface has, relative to the primary axis, radial and axial rake angles defined in coordination with each other to assure rotation of the element, during boring operation of the tool, in a selected direction about the secondary axis.

2. A boring tool according to claim 1 in which the cutting element has a flat cutting face and a circumferential surface which is cylindrical.

3. A boring tool according to claim 1 wherein the radial and axial rake angles are negative.

4. A boring tool according to claim 3 in which the axial rake angle value is about two times more negative than the radial rake angle value.

5. A boring tool according to claim 1 in which the cutting element is rotatably carried in a mount which is releasably connected to the tool body at a specified position and in a specified relation relative to the tool body.

6. A boring tool according to claim 5 including clamp means cooperating between the tool body and the mount for securing the mount in the specified position and relation.

7. A boring tool according to claim 6 in which the mount defines a shaft about which the cutting element is rotatable, and the clamp means cooperates with an end of the shaft proximate the cutting element.

8. A boring tool according to claim 5 including a dovetail connection of the mount to the tool body.

9. A boring tool according to claim 5 in which the axial and radial rake angles are negative, and the axial rake angle is about two times more negative than the radial rake angle.

10. A cutting member mount for a round rotatable cutter member useful in a boring tool having a body which is rotatable about and advanceable along a tool axis during boring, the mount including a base and an annular cutter member rotatably carried by the base for rotation about a cutter axis, the cutter member having a face extending substantially radially of the cutter axis and a peripheral cutting edge bounding the face, the mount including structural features by which the mount is rigidly connectable to the tool body in a predetermined relation to the body in which the cutter member face opens generally in the direction of boring rotation of the tool about its axis and the face has selected axial and radial angles of rake, relative to the tool axis, at a cutting location on the member at the place of maximum distance of the member cutting edge from the tool axis, the axial and radial rake angles having values which assure rotation of the member about the cutter axis in a selected direction during boring operation of the tool.

11. A cutting member mount according to claim 10 wherein the cutting member face is flat.

12. A cutting member mount according to claim 10 in which the cutting member has a circularly cylindrical circumferential surface which, with the member face, defines the cutting edge.

13. A cutting member mount according to claim 10 in which the axial and radial rake angles are negative.

14. A cutting member mount according to claim 13 in which the axial rake angle is about two times more negative than the radial rake angle.

15. A cutting member mount according to claim 10 including a shaft about which the cutter member is rotatable, and in which said structural features include faces on the shaft proximate the cutting member for securing the shaft to the tool body.

16. A cutting member mount according to claim 15 in which said structural features include one moiety of a dovetail connection.

17. A method for machining a bore of specified diameter in a workpiece of specified material with a self-propelled rotating cutter element comprising the steps of defining, with reference to the properties of the workpiece material, first operating values for element cutting speed, depth of cut and axial feed rate; establishing for those first operating values of the relations of cutter element axial and radial rake angles to tangential, radial and axial cutting forces and cutter element angular velocity and torque; identifying cutter element rake angles for maximum torque in a desired direction about an axis of rotation of the cutter element; establishing cutter element bearing forces at the identified rake angles; providing a rotatable boring tool carrying a rotating cutter element having a cutting point spaced one-half the specified bore diameter radially from the tool axis of rotation and having at the cutting point the identified axial and radial rake angles; and operating the tool at an angular velocity productive of the defined cutting speed and at the defined axial feed rate to machine the bore in a workpiece of that specified material.

18. The method according to claim 17 in which the specified material is compacted graphite iron, and the axial and radial rake angles are negative.

19. The method according to claim 18 in which the axial rake angle is about two times more negative than the radial rake angle.

20. The method according to claim 17 wherein providing the tool includes the further step of confirming structural adequacy of a tool body having a cutter element of specified size at the identified rake angles.

21. The method according to claim 17 including developing a force simulation model and using that model to identify the cutter element rake angles.

* * * * *